United States Patent Office 2,911,414
Patented Nov. 3, 1959

2,911,414

CYCLIC ESTERS DISUBSTITUTED WITH CERTAIN FLUORO-SUBSTITUTED RADICALS

Howard E. Simmons, Jr., Wilmington, Del., assignor to E. I. du Pont de Nemours and Company, Wilmington, Del., a corporation of Delaware No Drawing. Application March 22, 1957
Serial No. 647,752

4 Claims. (Cl. 260—327)

This invention relates to a new class of cyclic esters and more particularly to a new class of cyclic esters containing a heteroatom in addition to the ester oxygen and a process for their preparation.

Cyclic, self-esters of hydroxycarboxylic acids, the so-called lactones, are well known organic intermediates and solvents. Lactones having another heteroatom, in addition to the ester oxygen, present in the cyclic structure are also well known and in some respects are more versatile organic intermediates. Probably the best known of this type of cyclic ester are those wherein the second heteroatom is also oxygen, although those wherein the second heteroatom is sulfur and nitrogen are also quite common.

Characteristic of these cyclic esters containing two heteroatoms in the cyclic structure is their extreme hydrolytic sensitivity, either to water alone or to both aqueous acids and base—see for instance Salmi et al., Ber. 72B, 798 (1939) and Gaylord, J. Am. Chem. Soc. 72, 5316 (1950), wherein the synthesis of some 1,3-dioxolan-4-ones is discussed and the high hydrolytic sensitivity of such compounds is reported.

A new class of surprisingly stable and hydrolytically resistant cyclic esters of this type has now been discovered. These are the lactones of gamma- and delta-hydroxycarboxylic acids, carrying respectively in the beta- and gamma-positions an intrachain oxygen, nitrogen or sulfur atom and, again respectively, on the gamma- and delta-carbons (chain carbons carrying the hydroxyl groups) two wholly carbon chain radicals, the alpha-carbons of which carry at least one fluorine atom, with the remaining substituents on both said alpha-carbons and on all carbons linked thereto being halogen of atomic number 9–17, or one terminal or omega-hydrogen.

These new heterocyclic esters can alternatively be described as 2,2-disubstituted-1,3-dioxacyclopentan-4-ones; 2,2-disubstituted-1,3-dioxacyclohexan-4-ones; 2,2-disubstituted-1-oxa-3-azacyclopentan-5-ones; 2,2-disubstituted-1-oxa-3-azacyclohexan-6-ones; 2,2-disubstituted-1-oxa-3-thiacyclopentan-5-ones; and 2,2-disubstituted-1-oxa-3-thiacyclohexan-6-ones; wherein both of the indicated wholly carbon chain substituents on the 2-carbon of the heterocycle are directly and singly linked thereto through carbon carrying at least one fluorine substituent with the remaining substituents on both said linking carbons and on all carbons linked thereto being halogen of atomic number 9–17, except possibly for one hydrogen on omega-carbon of each said radical.

The novel heterocyclic esters of the present invention have the general formula

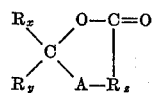

wherein $R_x$ and $R_y$ which can be alike or different, or together joined, are perhalogeno and w-hydroperhalogeno-substituted hydrocarbon radicals, of no more than six carbons each and totaling no more than eight carbons and when together joined of from five to seven ring carbons, in which the halogen is of atomic number from 9–17, and in which the first or alpha-carbon of each radical, that is, the carbon directly and singly linked to the indicated 2-carbon of the 1,3-diheterocycloalkanone structure carries at least one fluorine substituent; A is O, S, or NH; $R_z$ is a divalent hydrocarbon radical of up to 8 carbons and of up to two chain carbons between the free valences, i.e., so as to form with the two indicated heteroatoms, the intervening annular carbon, and the annular carbonyl carbon, a heterocyclic ester structure of from five to six ring members.

The new heterocyclic esters of this invention are notable not only for the surprising stability exhibited under a variety of conditions, but also for the peculiar process conditions by which they can be made. Conventional lactone formation generally involves acidic catalysis. Surprisingly the heterocyclic esters of this invention have been found preparable under basic catalysis. In the process aspect of the present invention, a carboxylic acid or ester-forming derivative thereof containing a hydrogen-bearing terminal oxygen, sulfur, or nitrogen atom and one carbon shorter in chain length than the hydroxy-substituted heterocarboxylic acid whose cyclic ester is desired is reacted under basic conditions with the requisite perhalogeno or w-hydroperhalogeno-fluoroketone. The process can be represented by the following structural formulas:

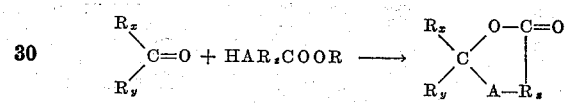

wherein $R_x$, $R_y$, $R_z$, A and R have the same significance as described above.

The new heterocyclic esters of this invention and the process for their preparation are illustrated in greater detail but are not to be limited by the following more specific examples in which the parts given are by weight.

Example I

To a stirred solution of 39.8 parts of sym.-dichlorotetrafluoroacetone in about 60 parts of anhydrous diethyl ether there was added with cooling 26.4 parts (an equimolar proportion based on the ketone) of ethyl α-hydroxyisobutyrate. Anhydrous sodium acetate (two parts) was then added, and the mixture was stirred at room temperature under anhydrous conditions for 48 hours. The solids were removed by filtration, and the filtrate was concentrated. The resulting crude, oily product was separated from the last traces of inorganic salts by distilling under vacuum in a short path Hickman still with a center well take-off and then was fractionated through a precision distillation column.

There was thus obtained 24.1 parts (98% of theory) of the ethyl hemiketal of sym.-dichlorotetrafluoroacetone as a colorless liquid boiling at 108° C. at atmospheric pressure, $n_D^{25}$ 1.3837, and 18.2 parts (64% of theory) of 2,2-bis(chlorodifluoromethyl)-5,5-dimethyl-1,3-dioxolan-4-one as a clear, colorless liquid boiling at 169° C. at atmospheric pressure, $n_D^{25}$ 1.3935. The infra-red spectrum of the latter product exhibited a strong carbonyl absorption at 5.38μ.

Analysis.—Calc'd for the dioxolan-4-one $C_7H_6Cl_2F_4O_3$: C, 29.4%; H, 2.1%; Cl, 24.9%; F, 26.6%. Found: C, 29.6%, 29.8%; H, 2.3%, 2.5%; Cl, 25.0%; F, 26.1%.

Example II

To a solution of 30.4 parts of hydroxyacetic acid in about 50 parts of N,N-dimethylformamide there was added 89 parts (1.1 molar proportion based on the acid) of sym.-dichlorotetrafluoroacetone with stirring and cooling in an ice bath. Anhydrous sodium acetate (one part) was then added, and the mixture was allowed to stand at room temperature for three days. The reaction mixture was then poured into 1000 parts of water, and the resultant solution was extracted three times with 135-part portions of methylene chloride. The combined methylene chloride extracts were washed successively with two 50-part portions of water and two 50-part portions of 2 N sodium hydroxide solution and finally were dried over anhydrous magnesium sulfate. The resulting methylene chloride solution was concentrated by distillation through a short Vigreux column to remove most of the methylene chloride solvent. There was thus obtained 63 parts of crude product as a pungent, pleasant smelling oil.

Distillation of the crude product through a precision fractionation column gave 52.7 parts (substantially quantitative yield) of 2,2 - bis(chlorodifluoromethyl)-1,3-dioxolan-4-one as a clear, colorless liquid boiling at 159–161° C. at atmospheric pressure. A heart-cut distilling at 160° C. at atmospheric pressure, $n_D^{25}$ 1.3870, was taken for analysis. The infrared spectrum thereof exhibited a strong carbonyl absorption at 5.35$\mu$.

Analysis.—Calc'd. for $C_5H_2Cl_2F_4O_3$: C, 23.4%; H, 0.8%; Cl, 27.6%; F, 29.6%; M.W., 257. Found: C, 23.7%; H, 1.0%; Cl, 27.2%; F, 29.4%; M.W., 236, 239.

*Example III*

A mixture of eighty parts of sym.-dichlorotetrafluoroacetone, 36.8 parts (an equimolar proportion based on the ketone) of mercaptoacetic acid, about 50 parts of freshly distilled N,N-dimethylformamide and one part of anhydrous sodium acetate was stored at room temperature for three days. The reaction mixture was then poured into 1000 parts of an ice/water mixture, and the resulting solution was extracted with three 135-part portions of methylene chloride. The combined methylene chloride extracts were washed successively with two 150-part portions of water and one 50-part portion of saturated aqueous sodium chloride solution. Finally the extracts were dried over anhydrous magnesium sulfate and then concentrated by distillation to remove most of the methylene chloride solvent. There was thus obtained 73 parts of a crude, oily product.

Distillation of the crude product through a precision fractionation column gave 54.5 parts (98% of theory) of 2,2-bis(chlorodifluoromethyl)-1,3-oxathiolan-5-one as a clear, colorless liquid boiling at 118–119° C. at a pressure corresponding to 47 mm. of mercury, $n_D^{25}$ 1.4394. Upon redistillation, there was obtained an analytically pure sample as a clear, colorless liquid boiling at 120° C. under a pressure corresponding to 50 mm. of mercury, $n_D^{25}$, 1.4388, $d_4^{25}$, 1.7064. The nuclear magnetic resonance and infrared spectra were compatible with the oxathiolanone structure. The latter also indicated a strong carbonyl absorption at 5.49$\mu$.

Analysis.—Calc'd. for $C_5H_2F_4O_2S$: C, 22.0%; H. 0.7%; F, 27.8%; S, 11.7%; M.W., 273. Found: C, 22.4%; H, 0.8%; F, 28.2%; S, 11.9%; M.W., 261, 276.

*Example IV*

To a mixture of 13.4 parts of dl-alanine and 60 parts (2.1 molar proportion based on the amino acid) of sym.-dichlorotetrafluoroacetone, there was added with stirring 46.8 parts of dimethyl formamide. The resulting solution was heated at 60° C. for three hours and then allowed to stand overnight at room temperature. The reaction mixture was taken up in 100 parts of methylene chloride and extracted with an 850-part portion of water. The aqueous phase was extracted three times with 50-part portions of methylene chloride. The combined methylene chloride extracts were washed with six 100-part portions of water and dried over anhydrous magnesium sulfate. The resulting methylene chloride solution was concentrated by distillation under vacuum at room temperature to give 40 parts (100% of theory) of a crude oily product.

Distillation of the product through a precision fractionation column gave 33.2 parts (83% of theory) of 2,2 - bis(chlorodifluoromethyl) - 4-methyl-1,3-oxazolidin-5-one as a clear, colorless liquid boiling at 109–110° C. under a pressure corresponding to 21 mm. of mercury; $n_D^{25}$ 1.4118. Redistillation of a center cut gave an analytical sample boiling at 104° C. at a pressure corresponding to 16 mm. of mercury; $n_D^{25}$ 1.4099. The infrared spectrum thereof exhibited a strong carbonyl absorption at 5.47$\mu$ and a strong N—H absorption at 2.96$\mu$.

Analysis.—Calc'd. for $C_6H_5Cl_2F_4NO_2$: C, 26.7%; H, 1.9%; F, 28.2%. Found: C, 27.1%; H, 2.1%; F, 27.9%.

The present invention is generic to five- and six-ring membered lactones having an oxygen, sulfur, or nitrogen atom in the ring one position removed from the lactone oxygen and carrying on the annular carbon between said lactone oxygen and said other cyclic heteroatom two perhalo- or omega-hydroperhalo carbon chain radicals having at least one fluorine atom on at least the alpha-carbon of each of said radicals. The two said perhalo- or omega-hydroperhalo radicals, which can be alike or different and can also be together joined, are of no more than six carbons each and total no more than eight carbons and when joined together contain a total of from five to seven and preferably from five to six ring carbons. The halogen substituents in these radicals are of atomic number from 9–17. Preferred because of greater stability are those products in which the majority of the halogen in the said perhalo and omega-hydroperhalo radicals is fluorine. Particularly outstanding are the perfluoro and omega-hydroperfluoro compounds.

More specifically the present invention is generic to a new class of 1,3-dioxolan-4-ones, 1,3-oxathiolan-5-ones, 1,3-oxazolidin-5-ones, 1,3-dioxan-4-ones, 1,3-oxathian-6-ones, and 1,3-oxazidin-6-ones in which the 2-carbons carry two perhalogeno or omega-hydroperhalogeno wholly carbon chain radicals in which the first or alpha-carbon of each radical, that is, the carbon directly and singly linked to the 2-carbon of the heterocycles, carries at least one fluorine substituent and in which the remaining halogens are of atomic number, from 9–17 with any substituent on other ring carbon being wholly hydrocarbon free of aliphatic unsaturation and of no more than six carbons.

The perhalogeno and omega-hydroperhalogeno substituted radicals in the 2-position contain no more than six carbons each and total no more than eight carbons, and when together joined form with the 2-carbon a carbocyclic structure of from five to seven and preferably from five to six ring carbons.

The present invention is also generic to the preparation of these 2,2-diperhalo- or di-omega-hydro-perhalo-substituted 1,3-dioxa-, oxathia-, and oxaazacycloalkanones by the reaction of α,α′-difluoroperhalo and α,α′-difluoro-omega-hydroperhalo ketones, with hydroxy, mercapto, and amino hydrogen-bearing amino-carboxylic acids having one less chain carbon between the carbonyl carbon and the hydrogen-bearing heteroatom than the total number of ring carbons desired in the final 1,3-diheterocycloalkanone. Since the products are limited to the 5- and 6-membered 1,3-diheterocycloalkanones, this means there will be from one to two chain carbons between the hydrogen-bearing heteroatom and the carboxylic acid group or ester-forming derivative thereof in this reactant.

The heteroatom in the acid or ester-forming derivative thereof, that is, the oxygen, sulfur, or nitrogen becomes the 3-heteroatom in the final product. The carbonyl carbon in the acid or ester-forming derivative thereof becomes the 4-carbon in the heterocycle. The chain carbons between these two said ring members thus become the 5-, or 5- and 6-ring members in the final products. Any substituent on the alpha- and beta-carbons of these acids or the ester-forming derivatives thereof will accordingly appear as substituents on the 5- and/or 6-carbon of the heterocyclic product. The carbonyl carbon of the perhalo or omega-hydroperhalo ketone reactant becomes the 2-carbon in the heterocyclic product, and the carbonyl oxygen thereof becomes the 1-oxygen of the heterocycle. Accordingly, the two perhalogeno or omega-hydroperhalogeno-substituted radicals in the ketone pendent on the carbonyl carbon thereof become the substituents on the 2-carbon of the heterocyclic product.

From the foregoing, it is apparent that any wholly carbon chain perhalogeno or omega-hydroperhalogeno ketone of no more than six carbons in each radical and no more than eight in both radicals pendent on ketone carbonyl wherein each of the alpha-carbons, that is, the two carbons immediately linked to the ketone carbonyl, carry at least one fluorine atom can be used. Particularly outstanding because of their being more readily available are such ketones which are aliphatic in character, that is aliphatic, cycloaliphatic, or mixed aliphatic/cycloaliphatic ketones having the requisite halogeno-substituents. The other halogeno-substituents should be of atomic number 9–17, i.e., fluorine or bromine.

Because of the greater stability of the products resulting therefrom, the most preferred perhalogeno and omega-hydroperhalogeno - $\alpha,\alpha'$ - difluoroketones are those which are not only aliphatic in character but in which the majority of the halogen substituents are fluorine. Suitable examples of such ketones, in addition to those given in the examples, include polyfluoroperhalogeno aliphatic ketones, e.g., perfluoroethyl perfluoropropyl ketone, i.e., perfluorohexan-3-one, diperfluoropropyl ketone, perfluoromethyl perfluoropropyl, ketone, hexafluoroacetone, i.e., perfluoroacetone, sym.-tetrachlorodifluoroacetone, etc.; polyfluoropherhalogeno aliphatic/cycloaliphatic ketones, e.g., perfluorocyclohexyl perfluoromethyl ketone, etc.; omega-hydroperfluoroketones aliphatic in character, e.g., omega-H, omega'-H perfluoroalkyl ketones, e.g., bis(4H-octafluorobutyl)ketone, i.e., 1H,9H-hexadecalfluorononan - 5 - one; bis(2H-tetrafluoroethyl)-ketone, i.e., 1H,5H-octafluoropentan-3-one; polyfluoroperhalocycloaliphatic ketones, e.g., perfluorocyclopentanone, etc.; and the like.

It is believed that a mol of water is formed in the condensation, whatever the mechanism, which water forms the very stable ketone hydrate. Accordingly, two mols or more of the ketone should be used for each mol of the cyclic ester-forming reactant.

As is apparent from the foregoing, the materials to be reacted with the aforesaid described polyfluoroperhalogeno and omega-hydropolyfluoroperhalogeno ketones are hydroxy, mercapto, and amino hydrogen-bearing amino two and three carbon chain alkanoic and substituted alkanoic acids and esters wherein the hydroxy, mercapto, or amino hydrogen-bearing amine groups are on the alpha- or beta-carbons. More specifically, this other heterocyclic ring-forming reactant is an hydroxy, mercapto, or amino hydrogen-bearing amino acetic or propionic acid or the esters thereof and the alpha- and beta-hydrocarbyl-substituted derivatives thereof. Thus, this reactant can be represented by the structural formula:

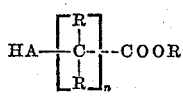

wherein, as before, A is O, S, or NH and wherein the R's which can be alike or different, are used to represent hydrogen or monovalent aliphatic, aromatic, cycloaliphatic, aralipathic, or alkaromatic hydrocarbon radicals, generally of no more than six carbons each and totaling no more than eight carbons, and $n$ is an integer of from 1 to 2. The carbon chain diradical involved in these heteroatom-substituted alkanoic acids and esters, i.e.,

corresponds to $R_2$ of the formula given above for the 1,3-diheterocycloalkanones of this invention and with the 1-oxa atom and the 3-oxa, -thia, or -aza atom, the necessary 2-carbon therebetween, and the 4-carbonyl carbon forms the annulus of the 2,2($\alpha,\alpha'$-difluoroperhalogeno and omega-hydroperhalogeno-substituted)-1,3-dioxa-, 1,3-oxathia-, and 1,3-oxaazacycloalkanones of the present invention.

Any such hydroxy, mercapto, or amino hydrogen-bearing amino acetic or propionic acid or ester, or the alpha and/or beta-hydrocarbyl-substituted derivatives thereof can be employed, including not only those shown in the examples above but also α-aminocarboxylic acids and esters such as leucine, i.e., α-aminoisocaproic acid, valine, i.e., α-aminoisovaleric acid, and the like; beta-aminocarboxylic acids and esters such as beta-valine, i.e., beta-aminoisovaleric acid, and the like; α-mercapto, i.e. thiolocarboxylic acids and esters such as thiomandelic acid, i.e., α-mercaptophenylacetic acid, and the like; beta-mercapto, i.e., beta-thiolocarboxylic acids and esters such as beta-mercaptopropionic acid, and the like; α-hydroxycarboxylic acids and esters such as ethyl α-hydroxypropionate, ethyl mandelate, i.e., ethyl α-hydroxyphenylacetate, 1-hydroxycyclohexanecarboxylic acid, and the like; beta-hydroxycarboxylic acids and esters such as beta-hydroxypropionic acid, and the like.

As illustrated in the foregoing, the new cyclic esters of this invention can be prepared by the direct condensation of the polyfluoroperhalogeno and omega-hydropolyfluoroperhalogeno ketones and the necessary heterosubstituted ester-forming derivative in the presence of catalytic quantities of a strongly basic reacting salt, that is, a salt of a strong base and a weak acid.

Suitable specific examples of catalysts which can be used include the carbonates, bicarbonates, hydroxides, cyanides, acetates, benzoates, and the like. Because of their being more readily available and having greater reaction efficiency, the alkali metal and alkaline earth metal salts are preferred. The most common of these are the lithium, sodium, potassium, magnesium, calcium, and barium, carbonates, bicarbonates, hydroxides, and acetates. Obviously, depending on whether the heterosubstituted cyclic ester-forming deactant is used in ester form per se or in the free acid form, variations in the catalysts will be necessary. Thus, with the free acids, sodium acetate would be the catalyst of choice. Frequently, it will be convenient to use as the catalyst the alkali or alkaline earth metal salt of the free acid form of the hetero-substiuted ester-forming derivative.

The reaction can be effected properly in the presence or absence of an inert organic reaction medium which should be anhydrous. Any inert liquid organic diluent can be used and, generally speaking, the most common are the normally liquid hydrocarbons and halogenated hydrocarbons, including aliphatic and halogenated aliphatic compounds, such as the hexanes, the heptanes, the octanes, the various chlorinated aliphatic hydrocarbons, including carbon tetrachloride, tetrachloroethylene, the chloropentanes, and the like; the aromatic and halogenated aromatic hydrocarbons, such as benzene, toluene, the xylenes, chlorobenzene, and the like; the cycloaliphatic and halogenated cycloaliphatic hydrocarbons, e.g., cyclohexane, chlorocyclohexane, and the like; polar organic solvents, such as dimethylformamide, tetrahydrofuran, acetonitrile, and the like. The choice of the particular diluent is not at all critical and will vary with such other normal variables as the reaction temperature found necessary. Generally, better results are achieved using the polar solvents.

The condensation is carried out at temperatures ranging from below 0° to generally no higher than 200° C., varying with the relative reactivity of the particular polyfluoroperhalogenoketone and the particular ester-forming derivative being used. Thus, with the short-chain ketones and the unsubstituted ester-forming derivatives of no more than a total of about six to eight carbons each, the reaction can be carried out at temperatures from generally no lower than about 20–25° C. to about 50° C. Practically speaking, the reaction can be effected in most instances over the range 0–100° C.

The pressure at which the reaction is carried out is largely immaterial and will vary, as will be apparent to those skilled in the art, with the specific nature of the reactants and the operating temperature being used, i.e., temperature and pressure are interdependent variables apparent for each particular system. Thus, if a lower boiling reactant is used and a higher reaction temperature is desired, efficient condensing means must be supplied to insure retention of that reactant in the reaction zone, or, alternatively, the reaction must be carried out in a closed reactor under superatmospheric pressure.

After the initial condensation is effected, any precipitated inorganic salts can be removed from the reaction mixture by simple filtration, and the product can be isolated and purified by conventional procedures. A simple method of carrying out these same steps, particularly in those instances where a liquid organic diluent is used and the precipitated inorganic salts are water-soluble, is to treat the entire reaction mixture with an excess of water, whereby the salts dissolve in the aqueous layer and the organic material including the product remains in the organic layer. Simple separation of the latter, followed by distillation and/or crystallization generally affords the desired cyclic esters directly in high purity. When the polar solvents are used generally no precipitate forms but work-up will be the same.

Suitable further specific illustration of the new cyclic esters of this invention, in addition to those given in detail in the foregoing examples, can be obtained by reacting the polyfluoroperhalogeno and omega-hydropolyfluoroperhalogeno ketone with the necessary cyclic ester-forming ingredients in the manner set forth in detail above. Thus, taking the polyfluoroperhalogeno and omega-hydropolyfluoroperhalogeno ketones listed specifically following the examples pair-wise with the ester-forming derivatives likewise listed following the examples, the following further new cyclic esters of this invention will be obtained. Thus, from perfluoroethyl perfluoropropyl ketone and leucine, there will be obtained 4-isobutyl-2-perfluoroethyl-2-perfluoropropyl-1,3-oxazolidin-5-one; from diperfluoropropyl ketone and valine, there will be obtained 4-isopropyl-2,2-bis(perfluoropropyl)-1,3-oxazolidin-5-one; from perfluoromethyl perfluoropropyl ketone and beta-valine, there will be obtained 4,4-dimethyl-2-perfluoromethyl-2-perfluoropropyl-1,3-oxazidin-6-one; from perfluoroacetone and thiomandelic acid, there will be obtained 2,2-bis(perfluoromethyl)-4-phenyl-1,3-oxathiolan-5-one; from sym.-tetrachlorodifluoroacetone and beta-mercaptopropionic acid, there will be obtained 2,2-bis-(dichlorofluoromethyl)-1,3-oxathian-6-one; from perfluorocyclohexyl perfluoromethyl ketone and ethyl alpha-hydroxypropionate, there will be obtained 2-perfluorocyclohexyl-2-perfluoromethyl-4-methyl-1,3-dioxolan-5-one; from 1H,9H-hexadecafluoronanan-5-one and ethyl mandelate, there will be obtained 2,2 - bis(4H - octafluorobutyl) - 5-phenyl - 1,3-dioxolan-4-one; from 1H,5H-octafluoropentan-3-one and 1-hydroxycyclohexanecarboxylic acid, there will be obtained 2,2-bis(2H - tetrafluoroethyl) - 4-oxo-1,3-dioxaspiro[4,5]-decane, i.e., 2,2-bis(2H-tetrafluoroethyl)-5,5-pentamethylene-1,3-dioxolan-4-one; from perfluorocyclopentanone and beta-hydroxypropionic acid, there will be obtained 7,7,8,8,9,9,10,10 - octafluoro - 2-oxo-1,5-dioxaspiro[5,4]-decane, i.e., 2,2 - perfluoropentamethylene-1,3-dioxan-4-one.

The new heterocyclic esters of this invention range from clear, colorless liquids to low-melting solids depending generally on the total number of carbons in the molecule. Generally speaking, those containing less than about 18 carbons are clear, colorless liquids boiling normally from 100–300° C.

Most surprising properties of the new cyclic esters of the present invention are their extreme chemical and physical stability and especially their high hydrolytic stability.

In general, simple cyclic esters, i.e., lactones, are readily hydrolyzed, especially with aqueous base—see Wagner and Zook, "Synthetic Organic Chemistry," Wiley, 1953, Method No. 249, p. 417. The heterocyclic esters, that is, those wherein an additional heteroatom over the cyclic ester oxygen is a member of the ring structure are even more readily hydrolyzed, in some cases by water alone and in all instances in aqueous base or acid—see, for instance, Salmi et al. and Gaylord, supra, with special reference to the 1,3-dioxolan-4-ones.

In surprising contrast the present heterocyclic esters with the perhalogenopolyfluoro-substituents or with the omega-hydroperhalogenopolyfluoro-substituents show exceedingly high hydrolytic stability. More specifically, the heterocyclic ester of Example I [2,2-bis(chlorodifluoromethyl)-5,5-dimethyl-1,3-dioxolan-4-one] a typical representative of this new class of cyclic esters was insoluble in a 1:1 mixture of concentrated hydrochloric acid and ethanol cold and was even inert to the same mixture when heated two hours at 80° C., as shown by dilution of the mixture and comparison with the refractive index of the insoluble material thus obtained with the starting material. Furthermore, this compound was insoluble in cold 6 N nitric acid and was inert therein when heated for a period of two hours at 95° C., as judged by dilution and comparison of refractive indices. Furthermore, the material was insoluble in cold concentrated sulfuric acid and was inert thereto even when heated to 140° C. The compound was also insoluble in cold 2 N aqueous sodium hydroxide solution and in 50% aqueous potassium hydroxide solution and gave a negative chloride test on dilution of the latter mixture, acidification, and addition of silver nitrate.

Similarly, the cyclic ester of Example II [2,2-bis(chlorodifluoromethyl)1,3-dioxolan-4-one] was insoluble in a 1:1 mixture of concentrated hydrochloric acid and ethanol in the cold, was insoluble in 6 N aqueous nitric acid solution, and was inert therein even when heated for two hours at 95° C., as judged by dilution and comparison of the refractive index of the recovered product with starting material. The compound was also insoluble in concentrated sulfuric acid and was inert thereto even when heated to 100° C. The product was also insoluble in 2 N aqueous sodium hydroxide solution in the cold.

Similarly, the cyclic ester of Example III [2,2-bis(chlorodifluoromethyl)-1,3-oxathiolan-5-one] was insoluble in a 1:1 mixture of concentrated hydrochloric acid and ethanol in the cold. It was insoluble in 6 N aqueous nitric acid in the cold and was inert to 6 N aqueous sulfuric acid when heated therein for two hours at 95° C., again as judged by dilution and comparison of the refractive indices. The product was also insoluble in aqueous 2 N sodium hydroxide in the cold.

The new heterocyclic esters of this invention thus exhibit surprisingly high hydrolytic stability. They are also of outstanding resistance against thermal and oxidative degradation and are in fact non-flammable. For instance, the cyclic ester of Example I [2,2-bis(chlorodifluoromethyl)-5,5-dimethyl-1,3 - dioxolan - 4 - one] was stable when heated at 150° C. for 48 hours with a stream of air blowing through the liquid, as judged by the lack of any visible coloration. Furthermore, the compounds possess sufficiently high boiling points so as to make them of utility in certain so-called "stable liquid" outlets, e.g., as transformer fluids, as fluids for high temperature power transmission or hydraulic systems, or for use in liquid-coupled mechanical drives, and the like, where a particularly high degree of oxidative and hydrolytic stability is needed at elevated temperatures.

The new cyclic esters of this invention are also useful as plant disease control agents. To illustrate specifically, 2,2-bis(chlorodifluoromethyl)-1,3-oxathiolan-5-one of Example III and 2,2 - bis(chlorodifluoromethyl) - 1,3-dioxolan-4-one of Example II are plant disease control agents, including specifically the systemic control of bean rust (*Uromyces phaseoli*). Thus, portions of the primary leaves of growing bean plants were dipped in 0.1% dispersions of these compounds and the plants then inoculated with bean rust spores. After an incubation period, disease readings were made with untreated check plants rated as 100% disease. Plants treated with the first compound, that is, the thiolanone showed 0% disease on the primary leaves and 13% disease on the first trifoliates. Plants treated with the second compound, that is, the dioxalanone showed 0% disease on the primary leaves and 25% disease on the first trifoliates.

Systemic control of bean rust was shown by watering growing bean plants with 0.001% dispersion of these compounds. Following inoculation with bean rust spores and a suitable incubation period, disease readings were made with untreated check plants rated as 100% disease. Plants so treated with both of these compounds, that is, the oxathiolanone and dioxalanone showed 0% disease on both the primary leaves and the first trifoliates.

The term "substituent" is used herein in its ordinary sense to indicate a replacement for hydrogen on carbon.

The foregoing detailed description has been given for clearness of understanding only and no unnecessary limitations are to be understood therefrom. The invention is not limited to the exact details shown and described for obvious modifications will occur to those skilled in the art.

I claim:
1. 2,2-bis(chlorodifluoromethyl)-1,3-dioxolan-4-one.
2. 2,2-bis(chlorodifluoromethyl) - 1,3 - oxathiolan - 5-one.
3. 2,2-bis(chlorodifluoromethyl)-5,5-dimethyl - 1,3 - dioxolan-4-one.
4. A 2,2-disubstituted-1-oxa-3-heterocycloalkanone selected from the class consisting of 2,2-disubstituted-1,3-dioxacyclopentan - 4 - ones, 2,2 - disubstituted - 1,3-dioxacyclohexan - 4 - ones, 2,2 - disubstituted-1-oxa-3-azacyclopentan-5-ones, 2,2-disubstituted-1-oxa-3-azacyclohexan-6-ones, 2,2 - disubstituted - 1-oxa-3-thiacyclopentan-5-ones, and 2,2 - disubstituted-1-oxa-3-thiacyclohexan-6-ones, the two substituents on the 2-carbons being selected from the class consisting of wholly carbon chain ω-hydroperhalohydrocarbyl and perhalohydrocarbyl radicals of not more than six carbons each, the total carbon content of the two substituents being not more than eight carbons, and in the case of perhalohydrocarbyl radicals the substituents can be together joined to form a perhalocarbocycle of from 5 to 6 ring members, the halogen substituents in said radicals being of atomic number from 9 to 17, inclusive, and the α-carbon of each of said two radicals carrying at least one fluorine atom, any substituents on the remaining ring carbons being hydrocarbyl radicals free of aliphatic unsaturation and containing a total of no more than eight carbon atoms, each hydrocarbyl radical having no more than six carbons.

References Cited in the file of this patent
UNITED STATES PATENTS

| | | |
|---|---|---|
| 2,265,947 | Loder et al. | Dec. 9, 1941 |
| 2,370,779 | Conaway | Mar. 6, 1945 |

FOREIGN PATENTS

| | | |
|---|---|---|
| 737,623 | Germany | July 20, 1943 |

OTHER REFERENCES

Cornforth et al.: Journal of the Chemical Society (London), 1952; pp. 1085 to 1088.

Holmberg: Arkiv. Kemi, 2: pp. 567–579 (1950) (in German, see Chemical Abstracts, vol. 46: p. 100g (1953)).

Salmi et al.: Deutsche Chemische Gesellschaft (Berichte), vol. 73: pages 1126 to 1131 (1940).

Salmi et al.: Deutsche Chemische Gesellschaft (Berichte), vol. 72: pages 798 to 803 (1939).

Willstatter et al.: Deutsche Chemische Gesellschaft (Berichte), vol. 56B: pages 2107 to 2109 (1923).